Aug. 27, 1935.  B. D. SAKLATWALLA ET AL  2,012,436
PROCESS OF MAKING MONOCALCIUM PHOSPHATE
Filed Sept. 6, 1932.  4 Sheets-Sheet 3

INVENTORS
Byramji D. Saklatwalla, Holbert E. Dunn
& Albert E. Marshall
by their attorneys
Byrnes, Stebbins, Parmelee & Blenko Aug. 27, 1935.  B. D. SAKLATWALLA ET AL  2,012,436
PROCESS OF MAKING MONOCALCIUM PHOSPHATE
Filed Sept. 6, 1932  4 Sheets-Sheet 4
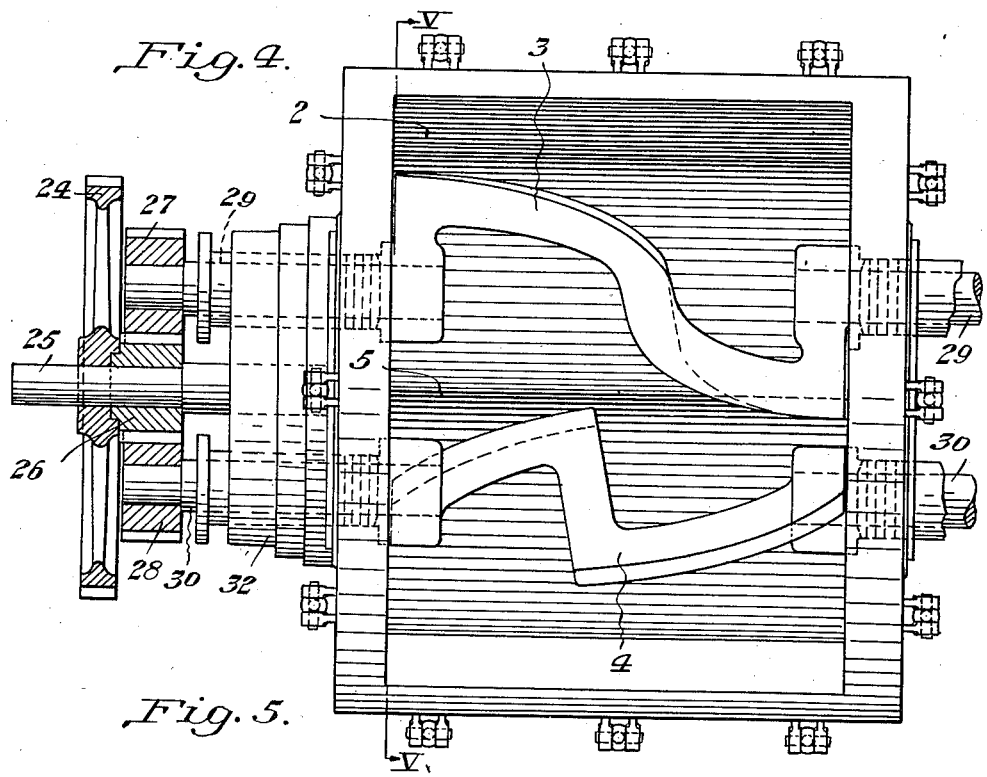
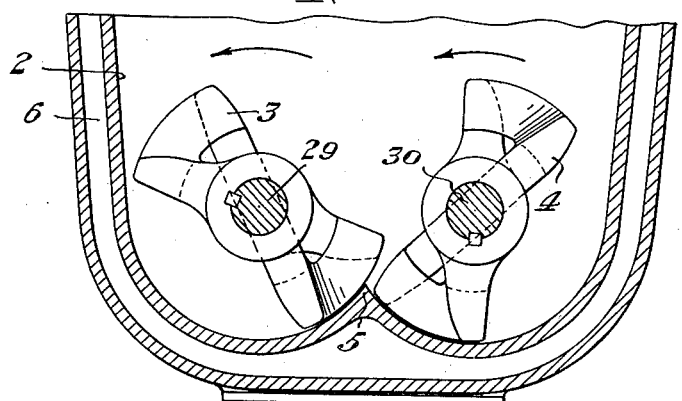
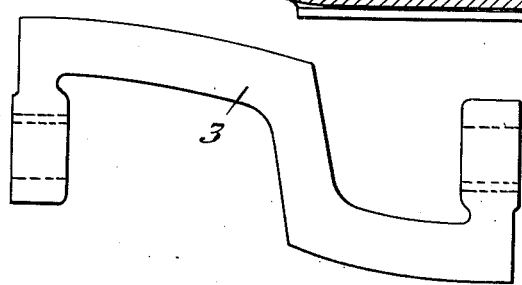

Patented Aug. 27, 1935

2,012,436

UNITED STATES PATENT OFFICE 2,012,436

PROCESS OF MAKING MONOCALCIUM PHOSPHATE

Byramji D. Saklatwalla and Holbert Earl Dunn, Crafton, Pa., and Albert E. Marshall, Scarsdale, N. Y., assignors to Southern Mineral Products Corporation, New York, N. Y., a corporation of Delaware Application September 6, 1932, Serial No. 631,848

2 Claims. (Cl. 23—109)

The present invention relates to the making of monocalcium phosphate, and more particularly to the process hereinafter described which results in the quick and economical production of a high grade monocalcium phosphate.

In accordance with our process, a mixing machine of the kneading type is charged with hydrated lime, to which is added a strong water solution of phosphoric acid. The acid is added at such a rate and the temperature is so controlled that a controlled rapid reaction takes place between the hydrated lime and the phosphoric acid. The excess water above that required as water of crystallization of the monocalcium phosphate is largely driven off as steam. The kneading machine is kept in continued operation to thoroughly knead the mass and prevent the formation of nuclei of dicalcium phosphate. The monocalcium phosphate reaction is carried to substantial completion in the kneading machine, and a high grade product is obtained requiring comparatively little, if any, aging, and having a high alkali neutralizing capacity and of a substantially pure white color.

The process will now be more fully described in connection with the accompanying drawings, in which—

Figure 4 is a top plan view of the kneading tub and blades;

Figure 5 is a section along the line V—V of Figure 4; and

Figure 6 is a side view of one of the kneading blades.

Figure 1:
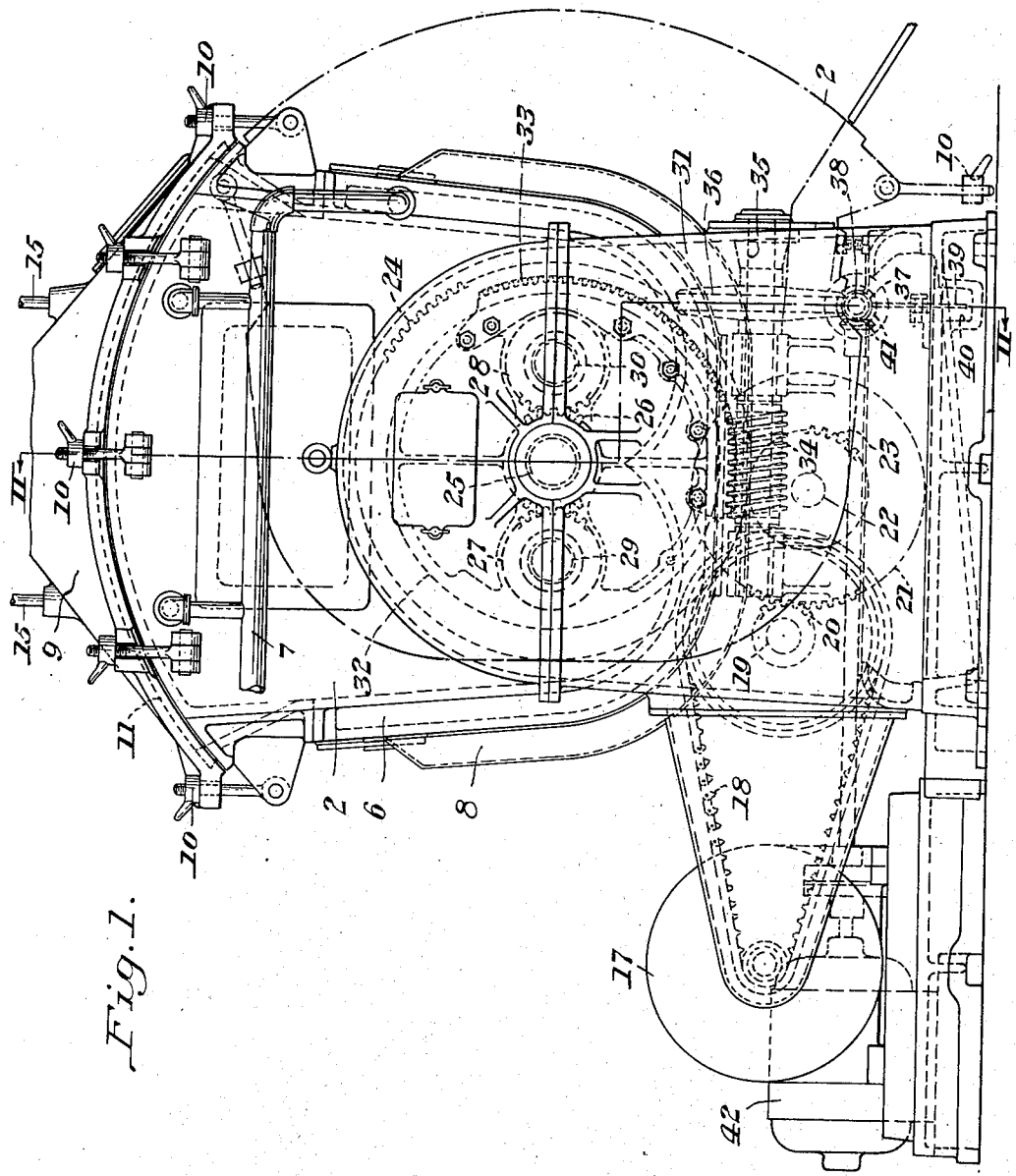
Figure 1 is a side elevation of a suitable form of kneading machine which may be used in carrying out the process.
Figure 2:
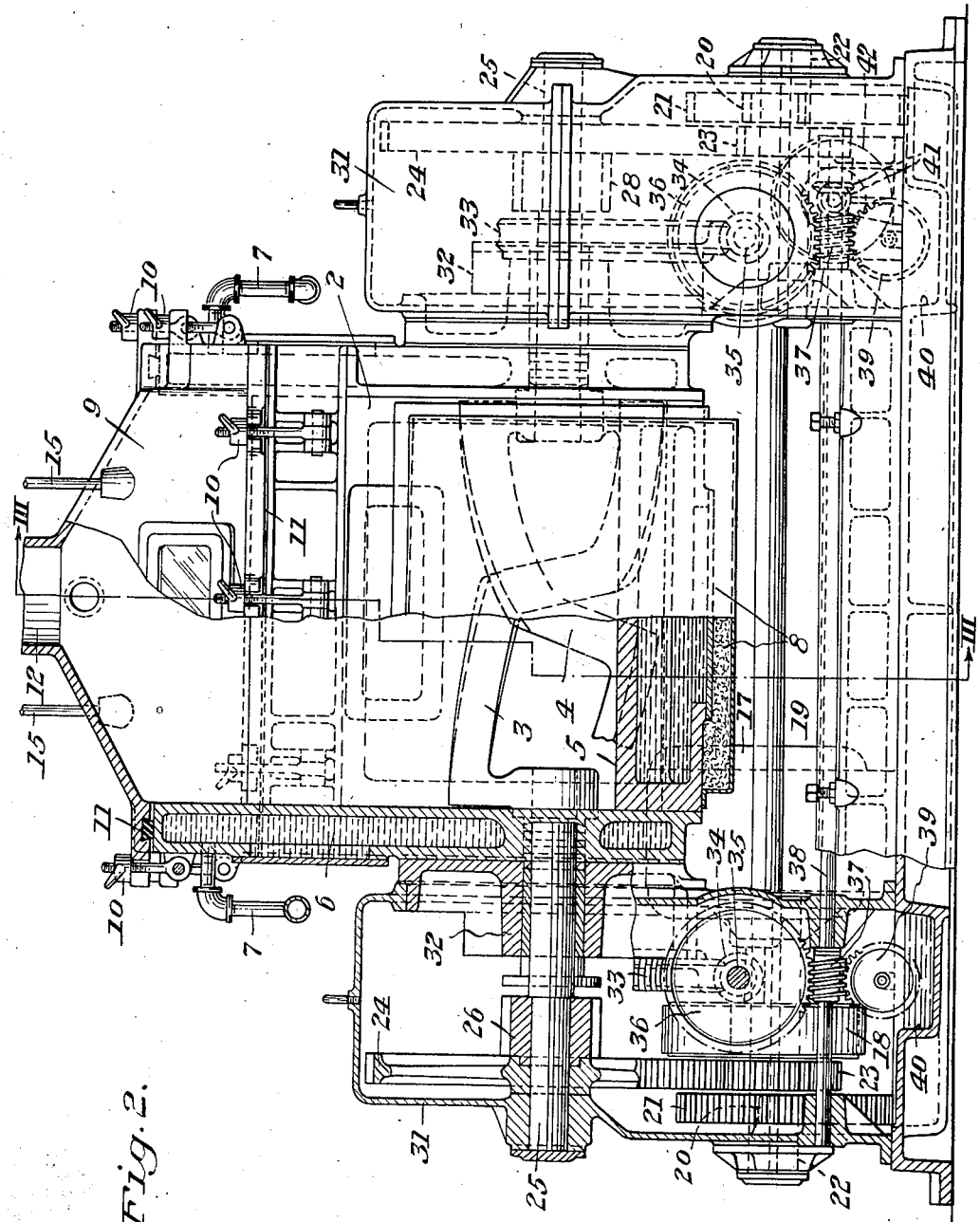
Figure 2 is a front elevation, partly in section, along the line II—II of Figure 1.
Figure 3:
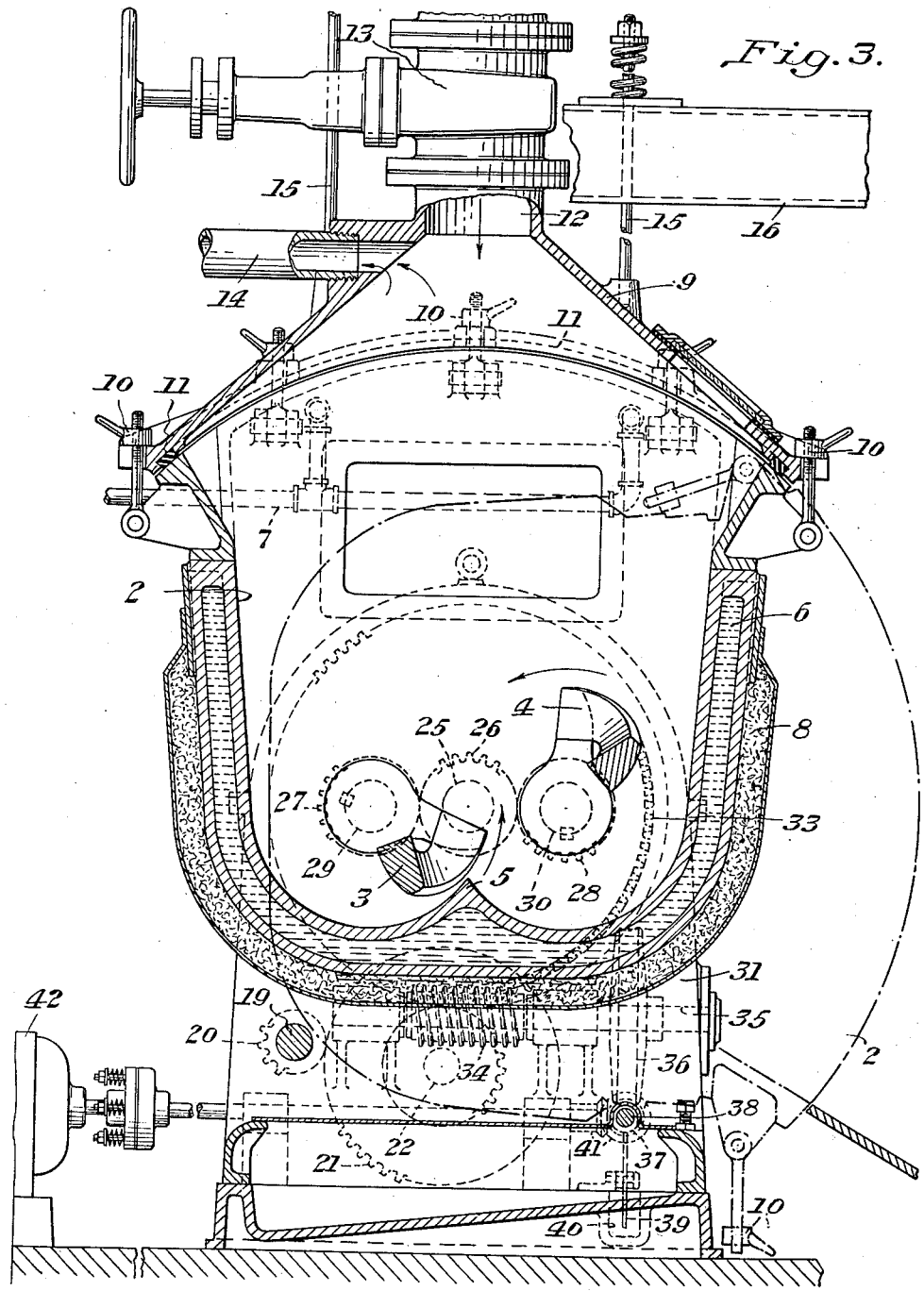
Figure 3 is a vertical section along the line III—III of Figure 2.

In the illustrated embodiment of the kneading machine, reference numeral 2 indicates the means or kneading tub in which the lime and phosphoric acid are thoroughly stirred and kneaded by means of mixing and kneading blades or arms 3 and 4. The shape of the kneading blades 3 and 4 is illustrated in Figures 5 and 6. The tub has a central ridge 5 along its bottom forming two rounded bottom portions in which the kneading blades 3 and 4 rotate. The action of the kneading blades is similar to that of a bread dough kneader. They serve not only to thoroughly mix the phosphoric acid and lime, but to break up lumps and expose any particles of initially formed dicalcium phosphate to the action of phosphoric acid.

The tub 2 has a hollow jacket 6 which may be supplied, if desired, with oil heated at a proper temperature for securing better circulated heat controlled within the kneading machine. Connections 7 are shown for supplying properly heated oil, if desired, to the jacket 6. The tub is further surrounded by a heat insulating jacket 8 which serves to prevent loss of heat.

The tub is provided with a cover 9 which makes air-tight connections with the top of the tub by means of clamping nuts 10 and gaskets 11. The cover has a feed inlet 12 controlled by the valve 13 through which the phosphoric acid and the lime may be introduced into the tub. An exhaust outlet 14 is provided, which may, if desired, be connected to a vacuum pump in case it is desired to maintain a vacuum in the tub. The cover 9 is supported by rods 15 from overhead beams 16 so that it may be lifted slightly to permit the tub to be dumped for discharging its contents.

The mechanism for driving the kneading blades 3 and 4 is as follows: The drive for rotating the kneader blades is from a motor 17 through a sprocket chain drive 18 for driving the shaft 19. The shaft 19 extends lengthwise of the machine and is urged to transmit power by driving the kneading blades 3 and 4 from both ends of the machine. The gearing connecting the shaft 19 to the blades 3 and 4 is the same for both ends of the machine, so that only the gearing connection at one end of the machine need be described. The shaft 19 carries a pinion 20 which drives a gear 21 on a short shaft 22. A pinion 23 upon shaft 22 drives the large gear 24 on a shaft 25. The shaft 25 carries a gear 26, which gear meshes with the gears 27 and 28 which are carried on the shafts 29 and 30 of the kneading blades 3 and 4, respectively. The kneading blades 3 and 4 rotate in the same direction as indicated by the arrows, so as to give the proper mixing and kneading action.

The tub is mounted between end housings 31, which house the gearing above described. It is mounted to turn in the housings on the axis of the shaft 25, thus permitting turning while the gears 27 and 28 of the kneading arms are in mesh with the gear 26. The shafts of the gears 26, 27 and 28 are journaled in a pivotal bearing casting 32 which is secured to the tub, and which casting carries a segment of a worm wheel 33. This segment is in mesh with a worm 34 on a shaft 35. The shaft 35 carries a worm wheel 36 which is driven by a worm 37 on a shaft 38. The worm 37 is lubricated by a gear 39 dipping in an oil well 40. The shaft 38 is driven through bevel gearing 41 from a motor 42. Suitable control mechanism for the motor 42 governs and limits the tilting of the tub to discharge the contents after the kneading operation.

The detailed description of the process as we have carried it out is as follows:

A total amount of 320 pounds of lime is weighed out into separate lots of 250 pounds, 60 pounds, and 10 pounds. The 250 pounds of hydrated lime (78% of the total lime) is charged into the mixer. There is then introduced into the mixer a 70% water solution of phosphoric acid in a total amount calculated at about 4 or 5% less than that required to combine with all 320 pounds of the lime. The phosphoric acid solution is fed into the lime gradually, the mixer blades 3 and 4 being operated to continuously knead and stir the mixture. The dry lime has relatively small thermal capacity so that the temperature of the reaction mass rises almost immediately to about 180° F. after the kneading in of the phosphoric acid solution commences. The phosphoric acid solution is fed in slowly so as not to drown and cool the exothermic reaction which takes place between the phosphoric acid and the lime. Usually about ten minutes is required for feeding in the phosphoric acid solution. When the temperature rises to about 180° F., steaming begins and water vapor is given off which is removed from the mixer. The temperature gradually rises during the continued feeding in of the phosphoric acid. The rate of feed, however should be such that the temperature does not increase over about 250° F., as a higher temperature is likely to cause discoloration. The exothermic reaction is usually sufficient to supply the necessary heat, particularly when the mixer is heat insulated. A very accurate temperature control may be had, if desired, by running a temperature-controlled fluid through the jacket 6 of the mixer.

After the phosphoric acid has been fed in, the operation of the mixer is continued for about a half hour, which will thoroughly knead the charge which is in a rather damp pasty condition. The kneading of the charge breaks up any lumps which may form and serves by a grinding or attrition action to break up and expose to the action of the acid any nuclei which may tend to remain as dicalcium phosphate.

The 250 pounds of lime is insufficient to completely neutralize the phosphoric acid, the charge at this point being deficient in lime by 22%, so that during this stage of the process there is free phosphoric acid present to attack and convert dicalcium phosphate particles into monocalcium phosphate.

Next, the 60 pounds of hydrated lime is added to the charge and the mixing is continued for a period of about one hour, when the mass begins to set and break up into powder. The mixing is continued for about a half hour from this point. At this time the remaining 10 pounds of hydrated lime is dusted in slowly and the mixing is continued for about 20 minutes more to take up any free phosphoric acid. The actual mixing time required for a batch is about two and one-half hours.

As the kneading continues, the temperature of the mixture tends to drop since the exothermic reaction between the lime and the phosphoric acid occurs principally during the first part of the mixing operation. If desired, the temperature may be maintained at, say, about 180° F. or above to the end of the kneading operation by means of the hot oil jacket of the mixing machine.

The mass as discharged from the mixture is sufficiently dry to be readily crumbly and does not contain more than about 1 or 2% of free moisture.

The kneading in the mixer may be carried out at atmospheric pressure, in which case the water is driven off as steam and may escape from the open top of the mixer. If desired, a partial vacuum, say, about 18 inches of mercury, may be applied to the mixer to draw off the water vapor. Since the water is one of the products of the reaction, its removal tends to speed the reaction and carry the monocalcium phosphate producing reaction to completion in the mixer.

When the mixing is carried out at atmospheric pressure, the monocalcium phosphate mass as discharged from the kneading machine is ordinarily aged for three or four days at a temperature of about 120° F. in the aging room. This aging time is relatively short compared with that required in the usual processes of making monocalcium phosphate, which results in a considerable economy in our process. If the kneading is carried out under partial vacuum, ordinarily no aging is required.

The temperature control of the process is important. The kneading action of the mixer thoroughly kneads and grinds together the lime and the phosphoric acid, resulting in a relatively quick reaction between them, which results in an increase in temperature to the point where water is driven off as steam. In the formation of the monocalcium phosphate from the phosphoric acid and lime, water is one of the end products of the reaction. The driving off of the water in the form of steam, which removes the water as an end product, tends to speed up and carry to completion the formation of the monocalcium phosphate.

The energetic driving off of the water and steam also permits the use of hydrated lime instead of calcium oxide or calcium carbonate which are commonly employed in making monocalcium phosphate. Hydrated lime can be more readily and cheaply obtained in relatively pure condition and can be stored and handled better than the quick lime or calcium carbonate.

Some of the advantages of the use of our process are as follows:—The kneading machine thoroughly kneads the mixture of phosphoric acid and lime, breaking up lumps and exposing any particles of initially formed dicalcium phosphate to the action of phosphoric acid. This results in carrying out the reaction, which is exothermic, in a relatively short time, so that the heat of the exothermic reaction can be usefully conserved and applied to the further speeding up of the reaction. The result is that the monocalcium phosphate producing reaction is carried to substantial completion in the kneading machine, and but little, if any, aging time is required for the mixture after it is discharged from the kneading machine. The product produced has a high alkali neutralizing capacity. The usual standard requirement for commercial monocalcium phosphate is that 100 pounds of monocalcium phosphate will neutralize at least 80 pounds of bicarbonate of soda. If the reaction between the phosphoric acid and the lime is not carried to substantial completion, dicalcium phosphate is present which reduces the alkali neutralizing capacity of the product. However, the product should not contain any free phosphoric acid. Therefore, in a high grade monocalcium phosphate the reaction between the lime and phosphoric acid must be carried substantially to completion, which is the case in our process, as shown by the fact that its alkali neutralizing capacity is well in excess of the standard requirement of 80. The temperature attained by the quick reaction of thoroughly kneading the mass and conserving the exothermic heat of reaction, drives off as steam not only the water which is formed as one of the end products of the monocalcium phosphate reaction, but also drives off the excess water over that required as water of crystallization for the monocalcium phosphate. This not only removes one of the end products of the monocalcium forming reaction, but also drives off any excess water coming from the water of hydration in the hydrated lime and from the water solution of the phosphoric acid. This makes possible the use of hydrated lime in the process. Ordinarily, a 70% solution of phosphoric acid in water is employed, since this gives about the correct amount of residual free moisture and water of crystallization desired in the ordinary operation of the process. The moisture of the final product can be controlled by varying the amount of water in the phosphoric acid solution used.

While we have specifically described our process in detail and have illustrated the preferred apparatus for use in carrying out the process, it is to be understood that the process is not so limited, but may be otherwise embodied and practiced within the scope of the following claims.

We claim:

1. The process of making monocalcium phosphate, which comprises adding a phosphoric acid solution to hydrated lime in an amount insufficient to completely neutralize the phosphoric acid solution while thoroughly kneading the pasty mixture, at a temperature in excess of 180° F., thereafter adding a further amount of hydrated lime in an amount somewhat in excess of that required to completely combine with the phosphoric acid while continuing the kneading of the mixture.

2. The process of making monocalcium phosphate, which comprises adding a phosphoric acid solution to hydrated lime in an amount insufficient to completely neutralize the phosphoric acid solution while thoroughly kneading the pasty mixture, thereafter adding a further amount of hydrated lime in an amount somewhat in excess of that required to completely combine with the phosphoric acid while continuing the kneading of the mixture.

BYRAMJI D. SAKLATWALLA.
HOLBERT EARL DUNN.
ALBERT E. MARSHALL.